US009939531B2

(12) United States Patent
Park et al.

(10) Patent No.: US 9,939,531 B2
(45) Date of Patent: *Apr. 10, 2018

(54) METHOD AND APPARATUS FOR POSITION MEASURING OF PORTABLE ELECTRONIC DEVICE

(71) Applicant: Samsung Electronics Co., Ltd., Suwon-si, Gyeonggi-do (KR)

(72) Inventors: Jeong-Min Park, Hwaseong-si (KR); Do-Hyoung Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

This patent is subject to a terminal disclaimer.

(21) Appl. No.: 14/863,980

(22) Filed: Sep. 24, 2015

(65) Prior Publication Data

US 2016/0011315 A1    Jan. 14, 2016

Related U.S. Application Data

(63) Continuation of application No. 13/848,326, filed on Mar. 21, 2013, now Pat. No. 9,170,109.

(30) Foreign Application Priority Data

May 9, 2012    (KR) .......................... 10-2012-0049189

(51) Int. Cl.
*G01S 19/08*    (2010.01)
*G01C 21/00*    (2006.01)
(Continued)

(52) U.S. Cl.
CPC .............. *G01S 19/08* (2013.01); *G01C 21/00* (2013.01); *G01S 19/20* (2013.01); *G01S 19/425* (2013.01)

(58) Field of Classification Search
CPC ........ G01S 19/20; G01S 19/425; G01S 19/08; G01C 21/00
See application file for complete search history.

(56) References Cited

U.S. PATENT DOCUMENTS 6,560,534 B2 *  5/2003  Abraham ................ G01S 19/05
                                                      342/357.43
6,798,377 B1    9/2004  Lupash et al.
(Continued)

*Primary Examiner* — Thomas G Black
*Assistant Examiner* — Peter D Nolan
(74) *Attorney, Agent, or Firm* — Jefferson IP Law, LLP

(57) ABSTRACT

A method for position measurement of a portable electronic device is provided. The method includes receiving, from a first satellite, first satellite information and state information of the first satellite information, receiving other state information of the first satellite information from a server that receives the other state information of the first satellite information from a terrestrial observatory, and using the first satellite information for the position measurement of the portable electronic device when the state information of the first satellite information received from the first satellite is unhealthy and the other state information of the first satellite information received from the server is healthy, wherein healthy state information indicates that satellite information may be used for the position measurement of the portable electronic device and unhealthy state information indicates that the satellite information may not be used for the position measurement of the portable electronic device.

22 Claims, 9 Drawing Sheets

(51) Int. Cl.
  *G01S 19/20*  (2010.01)
  *G01S 19/42*  (2010.01)

(56) References Cited

U.S. PATENT DOCUMENTS

| | | | | |
|---|---|---|---|---|
| 7,574,215 B1* | 8/2009 | Fan | .................. | G01S 5/0027 342/357.42 |
| 2005/0104772 A1* | 5/2005 | Diggelen | ................ | G01S 19/05 342/357.45 |
| 2005/0114022 A1* | 5/2005 | Podshivalov | ......... | G01S 19/258 701/468 |
| 2006/0055598 A1* | 3/2006 | Garin | .................. | G01S 19/05 342/357.64 |
| 2006/0114150 A1* | 6/2006 | van Diggelen | ......... | G01S 19/05 342/357.45 |
| 2007/0200752 A1* | 8/2007 | van Diggelen | ......... | G01S 19/05 342/357.31 |
| 2008/0018527 A1* | 1/2008 | LaMance | ................ | G01S 19/05 342/357.66 |
| 2008/0125971 A1* | 5/2008 | van Diggelen | ......... | G01S 19/05 701/530 |
| 2008/0186229 A1* | 8/2008 | Van Diggelen | ........ | G01C 21/00 342/357.31 |
| 2009/0066565 A1* | 3/2009 | Tsai | ........................ | G01S 19/05 342/357.42 |
| 2009/0295630 A1* | 12/2009 | Wengler | .................. | G01S 19/05 342/357.29 |
| 2010/0090892 A1* | 4/2010 | del Castillo | ............ | G01S 19/05 342/357.25 |
| 2010/0194634 A1* | 8/2010 | Biacs | ..................... | G01S 19/23 342/357.31 |
| 2011/0102256 A1* | 5/2011 | Shen | ....................... | G01S 19/05 342/357.31 |
| 2011/0254730 A1* | 10/2011 | McBurney | ............... | G01S 19/03 342/357.4 |
| 2014/0232595 A1* | 8/2014 | Rife | ........................ | G01S 19/20 342/357.58 |

* cited by examiner

METHOD AND APPARATUS FOR POSITION MEASURING OF PORTABLE ELECTRONIC DEVICE

CROSS-REFERENCE TO RELATED APPLICATION(S)

This application is a continuation application of prior application Ser. No. 13/848,326, filed on Mar. 21, 2013, which claimed the benefit under 35 U.S.C. § 119(a) of a Korean patent application filed on May 9, 2012 in the Korean Intellectual Property Office and assigned Serial number 10-2012-0049189, the entire disclosure of which is hereby incorporated by reference.

BACKGROUND OF THE INVENTION

1. Field of the Invention

The present invention relates to position measurement of a portable electronic device. More particularly, the present invention relates to a method and apparatus for position measurement of a portable electronic device based on an Assisted-Global Positioning System (A-GPS) scheme.

2. Description of the Related Art

A position measuring technology may use Global Positioning System (GPS) satellites in various fields. In particular, the position measurement technology using GPS satellites may be used in position measurement of mobile terminals, vehicle/ship navigation devices, and for any position measurement of other similar and/or suitable electronic devices having a position measuring capability.

In the related-art, American GPS-based position measuring methods have been provided. However, recently, a Russian GLObal NAvigation Satellite System (GLONASS), a European Union (EU) Galileo system, and a Chinese Compass system are or will be provided. Environments capable of more accurate position determination are created through a Global Navigation Satellite System (GNSS). In particular, as a number of available orbiting satellites, from which information is collected, increases, the GNSS can reduce errors and determine more accurate positions.

However, while the number of available satellites increases, a frequency of fault occurrence of satellites may also increase. The GPS, which was provided in the early 1970s by the United States (US) Department of Defense (DoD) to track positions of objects, has achieved accuracy and stability through long-term use. However, the GLONASS, which has recently been provided, has a relatively high frequency of fault occurrence and has lower stability and reliability than the GPS. Also, like the GLONASS, the Galileo system and the Compass system, which have been newly provided, may have low stability and reliability in their early stages. However, since not using available resources due to stability and a reliability may limit available position measurements, and thus may be a dilemma, there is a need for a method that can provide the maximum reliability in the existing use environment.

A related-art technology uses a Fault Detection (FD) technique or a Fault Detection and Exclusion (FDE) technique of a Receiver Autonomous Integrity Monitoring (RAIM) algorithm in order to exclude a faulty satellite signal from position measurement. In a GPS-based position determining method, a distance may be calculated and determined according to a time difference of a satellite signal between transmitting and/or receiving ends. Herein, when information of a specific satellite, that is used as a sample, is unhealthy, the information of the specific satellite should be excluded from a position measurement calculation. This process is performed by the FDE of the RAIM. The RAIM is often used for integrity monitoring in GPS navigation. The RAIM may improve the reliability of positions detected by devices using the GPS, by determining low-performance satellites and excluding at least one of such satellites from a position calculation at a time. The GPS typically needs at least four satellites in order to detect the position of an aircraft. Since an additional satellite should be used in order to use the RAIM, five satellites are typically needed in order to perform the FD.

That is, in order to provide for a case where currently-transmitted navigation information has an error due to a failure of a GPS satellite or a terrestrial observatory, a receiver may determine integrity of GPS satellite information, and accordingly, a user may exclude a satellite that provides wrong information or has a poor signal state or quality.

However, in a relate-art FDE method, an excluded satellite may not be recovered, i.e., used again, unless a device or the FDE method is artificially reset. In an actual live environment, the GPS and the GLONASS may be used in a mixed manner, and all available satellite information of the GPS and the GLONASS may be provided in an initial execution stage. However, in the case of the GLONASS that has relatively frequent faults and malfunctions, unhealthy satellite information may be increasingly excluded by the FDE method over time. As a result, in some cases, all GLONASS satellites determined to be available are also excluded by the FDE method, and only GPS satellites are used. Accordingly, the GLONASS is excluded and only the GPS is used even when the GPS and the GLONASS may be used together.

However, since a satellite may be excluded as an unhealthy state continues to be detected in a terrestrial observatory, even when the satellite has been excluded as an unhealthy state in a portable electronic device, the satellite may actually have been recovered and may currently be in a healthy state.

Therefore, a need exists for a system and method for a method and apparatus for position measurement of a portable electronic device based on an Assisted Global Positioning System (A-GPS) scheme.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a position measuring method and apparatus using satellite information received from a Global Positioning System (GPS) satellite and a GLObal NAvigation Satellite System (GLONASS) satellite and assistance satellite information received from a network.

Another aspect of the present invention is to provide a method and apparatus for determining a satellite for position measurement from among various satellites.

Another aspect of the present invention is to provide a method and apparatus for recovering a satellite that is excluded from position measurement due to an unavailable state.

In accordance with an aspect of the present invention, a method for position measurement of a portable electronic device is provided. The method includes receiving, from a first satellite, first satellite information and state information of the first satellite information, receiving other state information of the first satellite information from a server that receives the other state information of the first satellite information from a terrestrial observatory, and using the first satellite information for the position measurement of the portable electronic device when the state information of the first satellite information received from the first satellite is different from the other state information of the first satellite information received from the server, wherein healthy state information indicates that satellite information may be used for the position measurement of the portable electronic device and unhealthy state information indicates that the satellite information may not be used for the position measurement of the portable electronic device.

In accordance with another aspect of the present invention, a method for position measurement of a portable electronic device is provided. The method includes receiving, from a first satellite, first satellite information and state information of the first satellite information, receiving other state information of the first satellite information from a server that receives the other state information of the first satellite information from a terrestrial observatory, and determining whether to use the first satellite for the position measurement of the portable electronic device, by comparing the state information of the first satellite information received from the first satellite and the other state information of the first satellite information received from the server, wherein healthy state information indicates that satellite information may be used for the position measurement of the portable electronic device and unhealthy state information indicates that the satellite information may not be used for the position measurement of the portable electronic device.

In accordance with another aspect of the present invention, a method for position measurement of a portable electronic device is provided. The method includes receiving, from a first satellite, first satellite information and state information of the first satellite information, receiving other state information of the first satellite information from a server that receives the other state information of the first satellite information from a terrestrial observatory when the state information of the first satellite information received from the first satellite is unhealthy, and using the first satellite for the position measurement of the portable electronic device when the other state information of the first satellite information received from the server is healthy, and excluding the first satellite from the position measurement of the portable electronic device when the other state information of the first satellite information received from the server is unhealthy, wherein healthy state information indicates that satellite information may be used for the position measurement of the portable electronic device and unhealthy state information indicates that the satellite information may not be used for the position measurement of the portable electronic device.

In accordance with another aspect of the present invention, a method for position measurement of a portable electronic device is provided. The method includes receiving, from a first satellite, first satellite information and state information of the first satellite information, determining whether the first satellite is a GPS satellite, receiving other state information of the first satellite information from a server that receives the other state information of the first satellite information from a terrestrial observatory when the first satellite is not a GPS satellite, and determining whether to use the first satellite for the position measurement of the portable electronic device by comparing the state information of the first satellite information received from the first satellite and the other state information of the first satellite information received from the server, wherein healthy state information indicates that satellite information may be used for the position measurement of the portable electronic device and unhealthy state information indicates that the satellite information may not be used for the position measurement of the portable electronic device.

In accordance with another aspect of the present invention, a method for position measurement of a portable electronic device is provided. The method includes receiving, from a first satellite, first satellite information and state information of the first satellite information, determining whether the first satellite is a GPS satellite, receiving other state information of the first satellite information from a server that receives the other state information of the first satellite information from a terrestrial observatory when the first satellite is not a GPS satellite and state information of the first satellite information received from the first satellite is unhealthy, and using the first satellite for the position measurement of the portable electronic device when the other state information of the first satellite information received from the server is healthy, and excluding the first satellite from the position measurement of the portable electronic device when other the state information of the first satellite information received from the server is unhealthy, wherein healthy state information indicates that satellite information may be used for the position measurement of the portable electronic device and unhealthy state information indicates that the satellite information may not be used for the position measurement of the portable electronic device.

In accordance with another aspect of the present invention, an apparatus for a portable electronic device is provided. The apparatus includes at least one processor, a memory, and at least one program stored in the memory and configured to be executed by the at least one processor, wherein the program includes instructions for: receiving, from a first satellite, first satellite information and state information of the first satellite, receiving other state information of the first satellite information from a server that receives the other state information of the first satellite information from a terrestrial observatory, and using the first satellite information in position measurement of the portable electronic device when the state information of the first satellite information received from the first satellite is different from the other state information of the first satellite information received from the server, wherein healthy state information indicates that satellite information may be used for the position measurement of the portable electronic device and unhealthy state information indicates that the satellite information may not be used for the position measurement of the portable electronic device.

In accordance with another aspect of the present invention, an apparatus for a portable electronic device is provided. The apparatus includes at least one processor, a memory, and at least one program stored in the memory and configured to be executed by the at least one processor, wherein the program includes instructions for: receiving, from a first satellite, first satellite information and state information of the first satellite, receiving other state information of the first satellite information from a server that receives the other state information of the first satellite information from a terrestrial observatory, and determining whether to use the first satellite for position measurement of the portable electronic device, by comparing the state information of the first satellite information received from the first satellite and the other state information of the first satellite information received from the server, wherein healthy state information indicates that satellite information may be used for the position measurement of the portable electronic device and unhealthy state information indicates that the satellite information may not be used for the position measurement of the portable electronic device.

In accordance with another aspect of the present invention, an apparatus for a portable electronic device is provided. The apparatus includes at least one processor, a memory, and at least one program stored in the memory and configured to be executed by the at least one processor, wherein the program includes instructions for: receiving, from a first satellite, first satellite information and state information of the first satellite, receiving other state information of the first satellite information from a server that receives the other state information of the first satellite information from a terrestrial observatory when the state information of the first satellite information received from the first satellite is unhealthy, and using the first satellite for position measurement of the portable electronic device when the other state information of the first satellite information received from the server is healthy, and excluding the first satellite from the position measurement of the portable electronic device when the state information of the first satellite information received from the server is unhealthy, wherein healthy state information indicates that satellite information may be used for the position measurement of the portable electronic device and unhealthy state information indicates that the satellite information may not be used for the position measurement of the portable electronic device.

In accordance with another aspect of the present invention, an apparatus for a portable electronic device is provided. The apparatus includes at least one processor, a memory, and at least one program stored in the memory and configured to be executed by the at least one processor, wherein the program includes instructions for: receiving, from a first satellite, first satellite information broadcast and state information of the first satellite information, determining whether the first satellite is a GPS satellite, receiving other state information of the first satellite information from a server that receives the other state information of the first satellite information from a terrestrial observatory when the first satellite is not a GPS satellite, and determining whether to use the first satellite for position measurement of the portable electronic device, by comparing the state information of the first satellite information received from the first satellite and the other state information of the first satellite information received from the server, wherein healthy state information indicates that satellite information may be used for the position measurement of the portable electronic device and unhealthy state information indicates that the satellite information may not be used for the position measurement of the portable electronic device.

In accordance with another aspect of the present invention, an apparatus for a portable electronic device is provided. The apparatus includes at least one processor, a memory, and at least one program stored in the memory and configured to be executed by the at least one processor, wherein the program includes an instruction for: receiving, from a first satellite, first satellite information and state information for the first satellite, determining whether the first satellite is a GPS satellite, receiving other state information of the first satellite information from a server that receives the other state information of the first satellite information from a terrestrial observatory, when the first satellite is not a GPS satellite and the state information of the first satellite information received from the first satellite is unhealthy, and using the first satellite for position measurement of the portable electronic device when the other state information of the first satellite information received from the server is healthy, and excluding the first satellite from the position measurement of the portable electronic device when the other state information of the first satellite information received from the server is unhealthy, wherein healthy state information indicates that satellite information may be used for the position measurement of the portable electronic device and unhealthy state information indicates that the satellite information may not be used for the position measurement of the portable electronic device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and apparatus for position measurement of a portable electronic device. In particular, the exemplary embodiments provide a scheme for comparing satellite information received from various satellites and satellite information received through a network, excluding a satellite state from an available satellite item when the satellite state is not a healthy state, rechecking a satellite state after a predetermined time, and recovering an excluded satellite when the satellite state is an available healthy state. Furthermore, state information of a satellite may be classified as healthy or unhealthy, wherein healthy state information indicates that satellite information may be used to measure a position of the portable electronic device and unhealthy state information indicates that the satellite information may not be used to measure the position of the portable electronic device.

Figure 1:
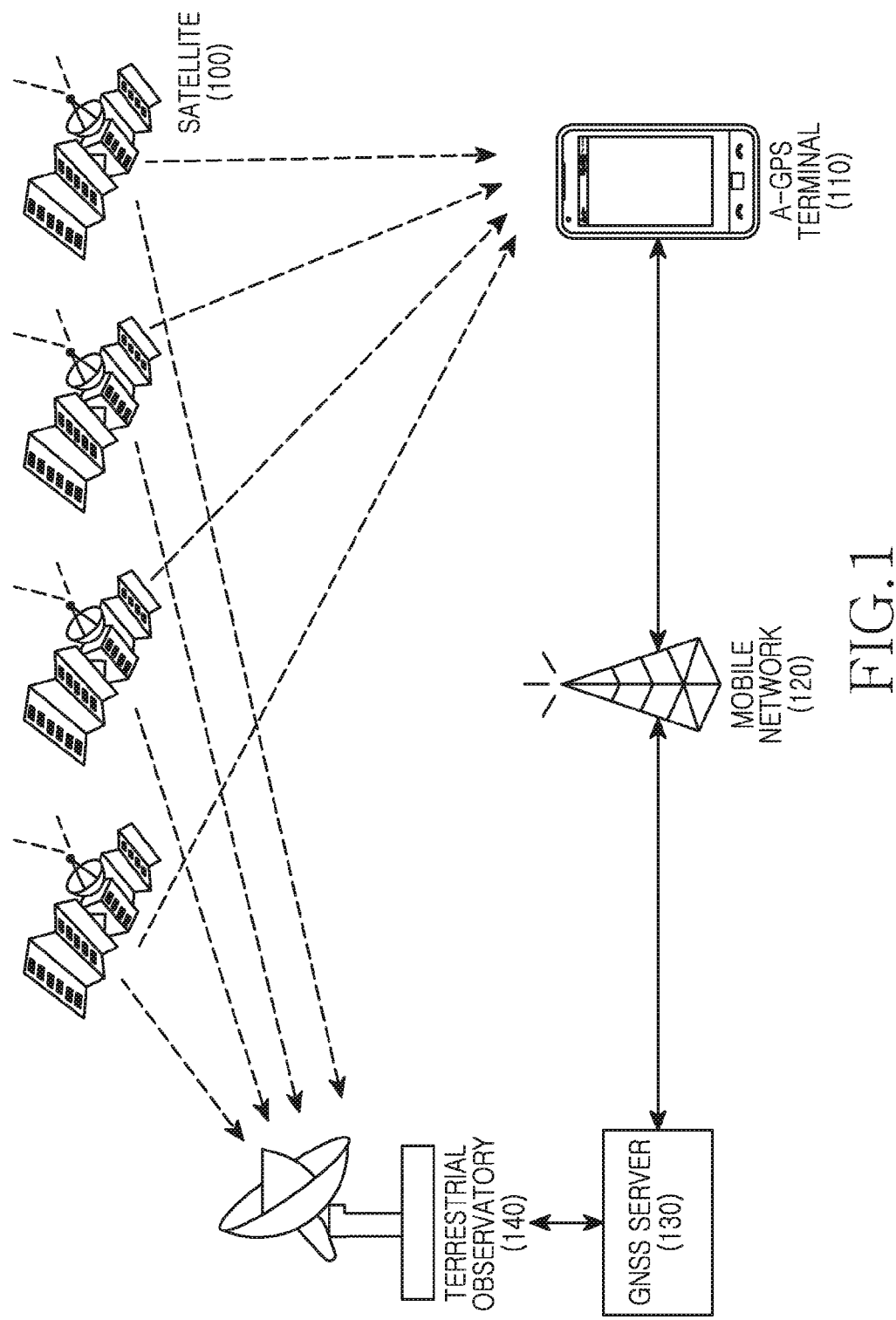
FIG. 1 is a diagram illustrating a network environment according to an exemplary embodiment of the present invention.

FIG. 1 is a diagram illustrating a network environment according to an exemplary embodiment of the present invention.

Referring to FIG. 1, a satellite 100 may revolve, or orbit, around the Earth at an altitude of tens of thousands of kilometers at a period of 12 hours, or the satellite 100 may orbit the Earth at any suitable orbital altitude at any suitable period. In the case of Global Positioning System (GPS) satellites, for example, 24 satellites orbit the Earth. The satellite 100 may transmit first satellite information for position measurement. The satellite 100 may be one of a GPS satellite, a GLObal NAvigation Satellite System (GLONASS) satellite, a Galileo satellite, and a Compass satellite. However, the present invention is not limited thereto, and the satellite 100 may be included in any similar and/or suitable position measurement system. The first satellite information may include satellite orbit information, which may also be referred to as ephemeris information, Almanac information, and correction coefficients. In particular, according to the present exemplary embodiment, the first satellite information may include first state information indicating whether a satellite is healthy, and/or may include second state information indicating whether a navigation message of a satellite is healthy.

An Assisted-GPS (A-GPS) terminal 110 may include a GPS receiver that collects information used for position determination from the satellite 100, and may determine its own position by using the collected information, and provides the determined position to a user. Also, in order to reduce an initial position information receiving time, which may also be referred to as a Time To First Fix (TTFF), the A-GPS terminal 110 may transmit an assistance data request to a Global Navigation Satellite System (GNSS) server 130 through a mobile network 120, and may receive assistance data from the GNSS server 130 through the mobile network 120. The system using the GNSS server 130 providing assistance data to the A-GPS terminal 110 may be referred to as the A-GPS technology. The A-GPS technology may be different from a general GPS terminal in that it may simultaneously collects information used for position determination from the satellite 100 and a wireless communication network.

In an exemplary embodiment, the A-GPS technology may be periodically updated in order to provide GPS assistance data to the A-GPS terminal 110. By using the periodic updates, the position of the GPS may be determined within a short time. Specifically, the GNSS server 130 may provide the A-GPS terminal 110 with GPS orbit information and ephemeris data as assistance data for reduction of the TTFF, accordingly, the GPS receiver may rapidly establish a data link with an initial satellite. Also, the assistance data may include accurate time information, approximate time information for future position information processing, simple information of a GPS signal, and information affecting a GPS signal, such as a condition of a relevant region ionization layer, by using position coordinates of a fixed base station.

According to the exemplary embodiments, similar to the first satellite information, the assistance data may include at least one of first state information indicating whether a satellite is healthy and second state information indicating whether a navigation message of a satellite is healthy. Hereinafter, the first state information and the second state information of the assistance data may be referred to as second satellite information. However, the first state information and the second state information of the second satellite information of the GNSS server 130 may be different from the first state information and the second state information of the first satellite information and the first state information and the second state information of the second satellite information of the satellite 100. Furthermore, the first state information and the second state information of the second satellite information may be more accurate than the first state information and the second state information of the first satellite information. The reason for this is that the second satellite information is provided from a terrestrial observatory 140 controlling satellites to the GNSS server 130 so that the GNSS server 130 may provide the collected second satellite information to an electronic device, such as the A-GPS terminal 110, at any time.

Also, the A-GPS terminal 110 may request a position calculation by transmitting the information received through its GPS receiver to the GNSS server 130 or to a separate assistance server (not shown). The assistance server may receive a healthy satellite signal, and may perform a large amount of calculation. Accordingly, unhealthy signals received by the GPS receiver may also be compared and analyzed.

Similar to the A-GPS terminal 110, the terrestrial observatory 140 may receive a satellite signal from the satellite 100, and may provide the GNSS server 130 with satellite information received from the satellite 100, at any time. Also, the terrestrial observatory 140 may control the satellite 100 through a separate control channel. For example, the terrestrial observatory 140 may receive a signal from the satellite 100 in order to calculate a position and a speed of the satellite 100, may continuously monitor an atomic clock in the satellite 100 in order to calculate the accurate position and time data of the satellite, and may periodically transmit the results to the satellite 100. That is, the terrestrial observatory 140 may have the accurate position and time data of the satellite 100, and may retain and manage the accurate first and second state information in real time by periodically calculating the position and speed of the satellite and by continuously monitoring the atomic clock in the satellite 100.

On the other hand, when the A-GPS terminal 110 has excluded the satellite 100, with respect to the position measurement, according to the state of the satellite 100 before the repair of the failure of the satellite 100 by the terrestrial observatory 140, the first and second state information in the second satellite information of the terrestrial observatory 140 may be different from the first and second state information in the first satellite information of the satellite 100.

That is, since the satellite 100, which is actually excluded as an unhealthy state, continues to be recovered in the terrestrial observatory 140, even when the satellite 100 has been excluded as an unhealthy state in the A-GPS terminal 110, the satellite 100 may actually have been recovered as a healthy state.

Thus, in the present exemplary embodiment, the A-GPS terminal 110 may compare the first satellite information, which is received from the satellite 100, and the second satellite information of the GNSS server 130, which is received through the network, in order to determine whether to use a relevant satellite, that being satellite 100 in the present exemplary embodiment, in the position measurement or in order to recover the satellite that was pre-excluded. A detailed description thereof will be made with reference to FIGS. 3 through 6.

Figure 2:
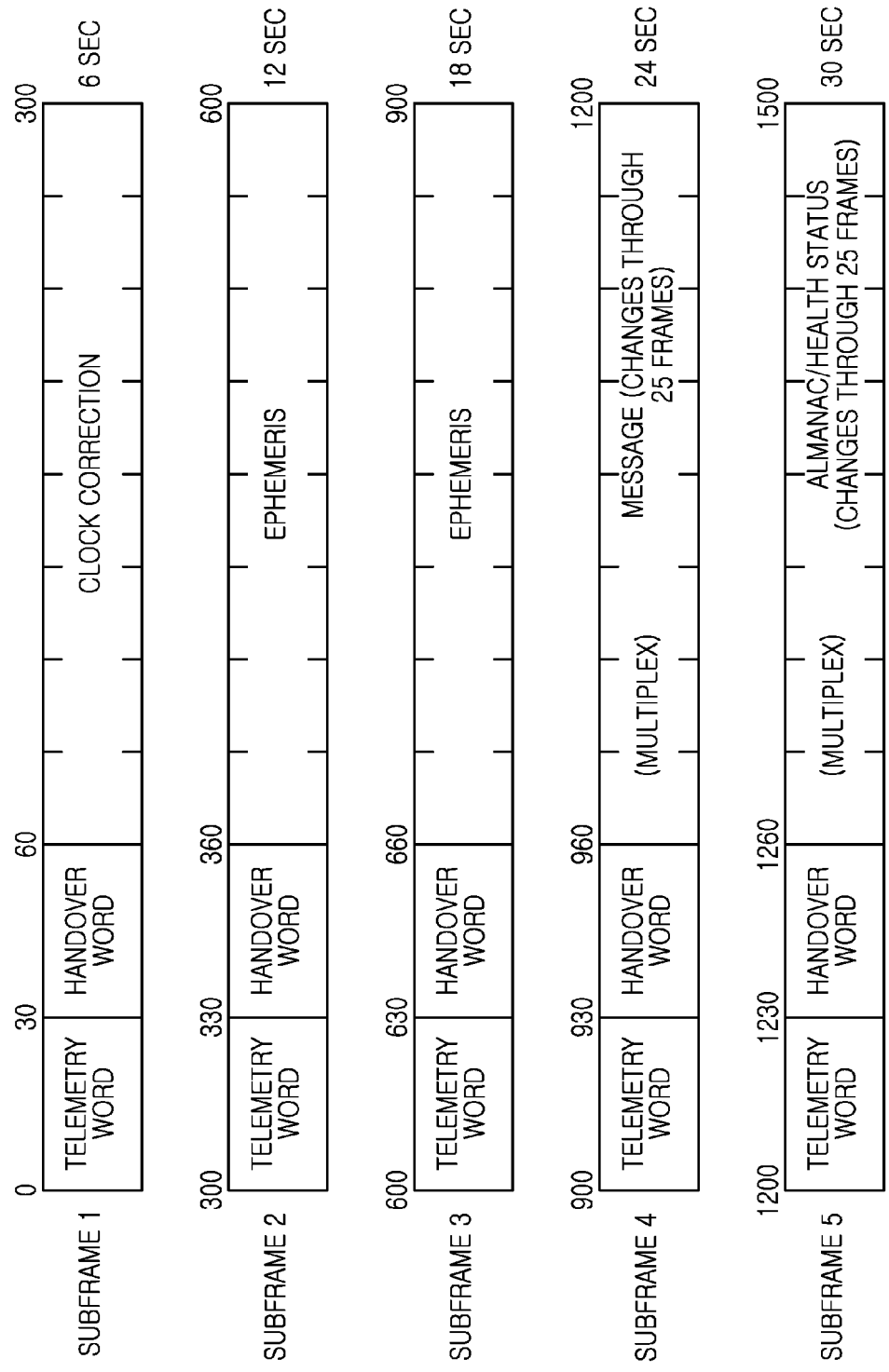
FIG. 2 is a diagram illustrating a navigation message structure according to an exemplary embodiment of the present invention.

FIG. 2 is a diagram illustrating a navigation message structure according to an exemplary embodiment of the present invention.

Referring to FIG. 2, a navigation message of a GPS signal may include satellite orbit information, which may also be referred to as ephemeris information, Almanac information, correction coefficients, and other similar and/or suitable information. Data may be transmitted at a rate of 50 bits per second (bps), and one word may include 30 bits, ten words constitute one subframe, five subframes constitute one page, and 25 pages constitute one navigation message. In each subframe, a first word, shown as a "TELEMETRY WORD" in FIG. 2, and a second word, a "HANDOVER WORD" may be pre-transmitted prior to transmission of all message types. All Reasonable Transportation Control Measure (RTCM) messages are comprised of 30-bit words.

In general, a preamble of the first word may indicate a start or an end of data when transmitting the data. The preamble in the navigation message of the GPS signal indicates the start of the subframe, and has a length of 8 bits, such as '10001011'. The receiver performs frame synchronization prior to performance of navigation, which means subframe synchronization of the GPS signal, and a preamble check may be one of the frame synchronization methods. When the preamble of each frame is checked, if the preamble does not have a predetermined value, such as '10001011', then the preamble is determined to be abnormal. The second word, HANDOVER WORD, includes a count message having a length of 17 bits, and a subframe IDentifier (ID) represented by 20th to 22nd bits.

The subframe may also include third to tenth words, which include data needed for position measurement, and the third through tenth words may be received from the GPS satellite, orbit information or ephemeris, Almanac, clock correction value, ionization layer correction data, health data, and other similar data. That is, a 37,500-bit message included in the GPS signal may be transmitted at a rate of 50 bps. Thus, 30 seconds are taken to acquire only orbit information from among the 1,500-bit navigation message, and 12.5 minutes are taken to receive all the data.

Figure 3:
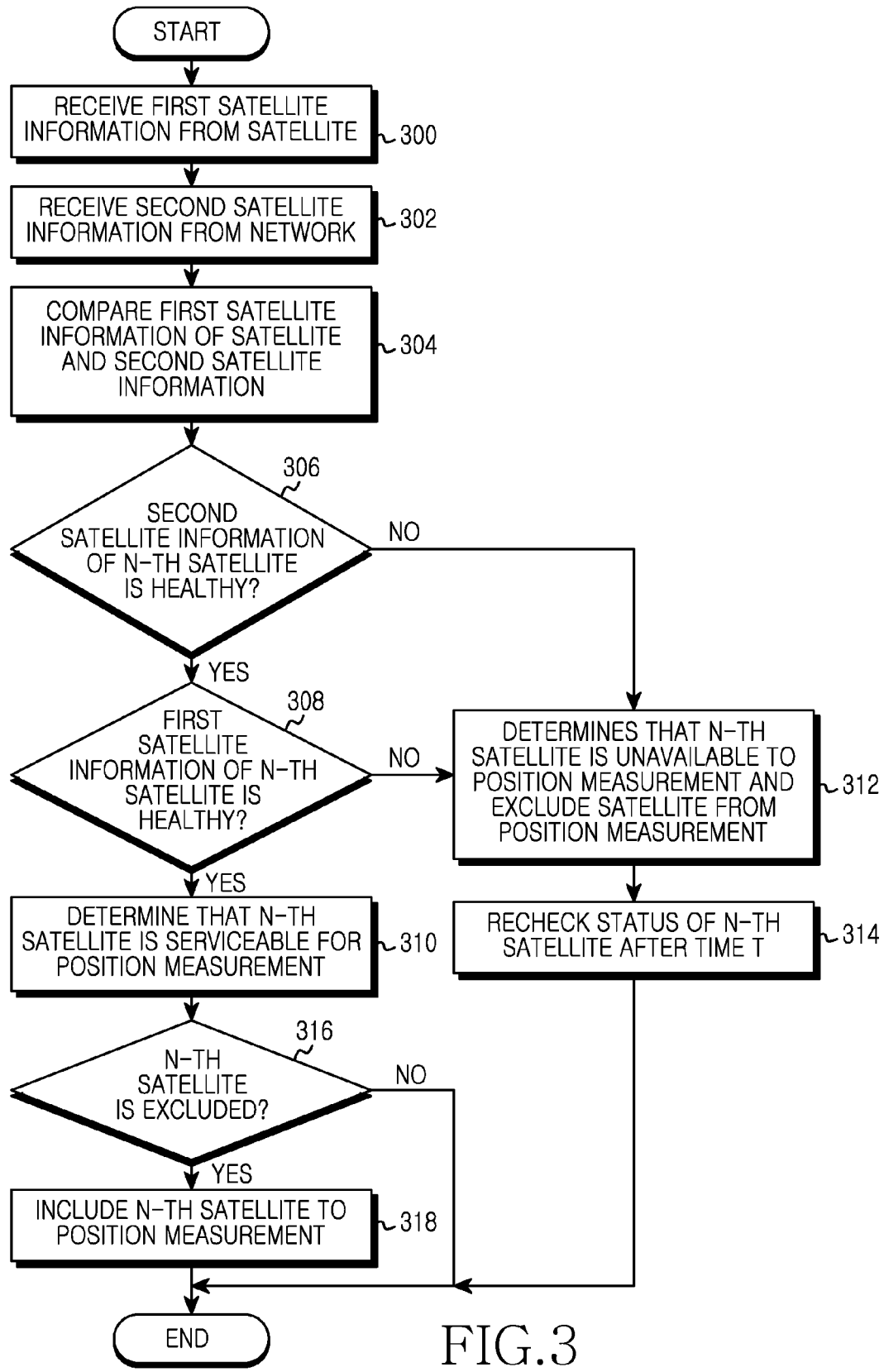
FIG. 3 is a flow diagram illustrating a position measuring process according to a first exemplary embodiment of the present invention.

FIG. 3 is a flow diagram illustrating a position measuring process according to a first exemplary embodiment of the present invention.

Referring to FIG. 3, in step 300, an electronic device, which includes a GPS receiver, receives first satellite information from a relevant satellite, wherein the relevant satellite may be the $n^{th}$ satellite of N satellites used for the position measuring process. The relevant satellite may be one of a GPS satellite, a GLONASS satellite, a Galileo satellite, a Compass satellite, and any other similar and/or suitable type of satellite. The first satellite information may include satellite orbit (Ephemeris) information, Almanac information, and correction coefficients. In particular, according to the present exemplary embodiment, the first satellite information may include first state information indicating whether a satellite is healthy, and/or second state information indicating whether a navigation message of a satellite is healthy.

Thereafter, in step 302, the electronic device receives second satellite information from a GNSS server through a network. The second satellite information may be provided to a user for the purpose of executing a rapid position measurement. In particular, according to the present exemplary embodiment, the second satellite information may include first state information indicating whether a satellite is healthy, and/or second state information indicating whether a navigation message of a satellite is healthy. However, the first state information and the second state information of the first satellite information may be different from the first state information and the second state information of the second satellite information, and the first state information and the second state information of the second satellite information may be more accurate than the first state information and the second state information of the first satellite information.

Next, in step 304, the electronic device compares the first satellite information of the relevant satellite and the second satellite information that is related to the relevant satellite. That is, in step 304, the electronic device compares the first state information or the second state information about the satellite, as received in the first satellite information, with the first state information or the second state information about the relevant satellite, as received in the second satellite information. Alternatively, the electronic device compares the first satellite information, which may include the first state information or the second state information corresponding to a plurality of satellites, with the first state information or the second state information about a plurality of satellites.

Next, in step 306, the electronic device determines whether the second satellite information having the first state information or the second state information about the relevant satellite is healthy. When the second satellite information having the first state information or the second state information about the relevant satellite is healthy, then the electronic device proceeds to step 308. In step 308, the electronic device determines whether the first satellite information having the first state information or the second state information about the relevant satellite is healthy. When the first satellite information having the first state information or the second state information about the relevant satellite is healthy, then the electronic device proceeds to step 310.

In step 310, the electronic device determines that the relevant satellite is available for the position measurement. On the other hand, when it is determined in step 306 that the second satellite information having the first state information or the second state information about the relevant satellite is not healthy, or when it is determined in step 308 that the first satellite information having the first state information or the second state information about the relevant satellite is not healthy, then the electronic device proceeds to step 312. That is, when at least one of the second satellite information having the first state information or the second state information about the relevant satellite and the first satellite information having the first state information or the second state information about the relevant satellite is not healthy, the electronic device may determine that the relevant satellite is unavailable for including in the position measurement, and may exclude the relevant satellite from the position measurement, in step 312.

In step 314, after the lapse of an amount of time t, the electronic device rechecks the first state information or the second state information about the relevant satellite based on the second satellite information received from the GNSS server through the network, and determines whether the relevant satellite is available in the position measurement. Next, in step 316, the electronic device determines whether the relevant satellite has been excluded. When the relevant satellite has been excluded, the electronic device includes the relevant satellite in the position measurement in step 318. On the other hand, when the relevant satellite has not been excluded, the electronic device ends the process of the first exemplary embodiment.

In the first exemplary embodiment of FIG. 3, the first state information and the second state information of the second satellite information are compared with the first state information and the second state information of the first satellite information, and a process scheme according to the comparison result is the same as Table 1 below.

TABLE 1

|  | case 1 | case 2 | case 3 | case 4 |
| --- | --- | --- | --- | --- |
| Satellite | healthy | unhealthy | healthy | unhealthy |
| GNSS Server | healthy | unhealthy | unhealthy | healthy |
| Processing | Use satellite information | Do not use satellite information | Do not use satellite information | Do not use satellite information |

Figure 4:
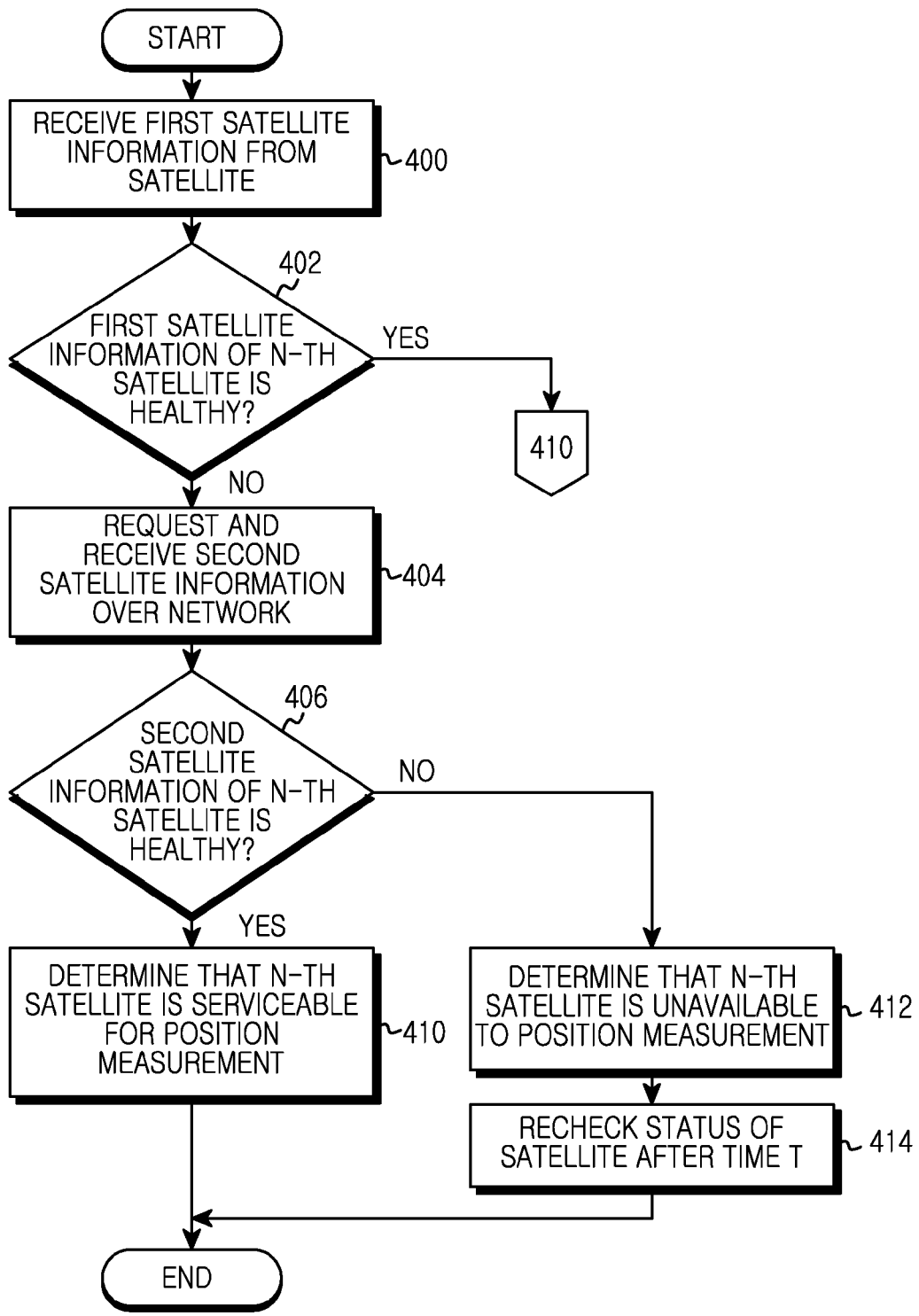
FIG. 4 is a flow diagram illustrating a position measuring process according to a second exemplary embodiment of the present invention.

FIG. 4 is a flow diagram illustrating a position measuring process according to a second exemplary embodiment of the present invention.

Referring to FIG. 4, in step 400, an electronic device including a GPS receiver receives first satellite information from a relevant satellite, wherein the relevant satellite may be the $n^{th}$ satellite of N satellites used for the position measuring process. The relevant satellite may be one of a GPS satellite, a GLONASS satellite, a Galileo satellite, a Compass satellite or any other similar and/or suitable satellite. The first satellite information may include satellite orbit information, i.e., ephemeris information, Almanac information, and correction coefficients. In particular, according to the present exemplary embodiment, the first satellite information may include first state information indicating whether a satellite is healthy, and/or second state information indicating whether a navigation message of a satellite is healthy.

Thereafter, in step 402, the electronic device determines whether the first state information or the second state information about the relevant satellite, as included in the first satellite information, is healthy. When the first state information or the second state information about the relevant satellite, as included in the first satellite information, is healthy, then the electronic device proceeds to step 410. On the other hand, when the first state information or the second state information about the relevant satellite, as included in the first satellite information, is not healthy, then the electronic device requests and receives second satellite information from the GNSS server in step 404. According to another exemplary embodiment, the electronic device may periodically receive the second satellite information form the GNSS without request.

The second satellite information is provided to a user for the purpose of rapid position measurement. In particular, according to the present exemplary embodiment, the second satellite information may include first state information indicating whether a satellite is healthy, and/or may include second state information indicating whether a navigation message of a satellite is healthy. However, the first state information and the second state information of the first satellite information may be different from the first state information and the second state information of the second satellite information, and the first state information and the second state information of the second satellite information may be more accurate than the first state information and the second state information of the first satellite information.

Next, in step 406, the electronic device determines whether the second satellite information having the first state information or the second state information about the relevant satellite is healthy. When the second satellite information having the first state information or the second state information about the relevant satellite is healthy, then the electronic device proceeds to step 410.

In step 410, the electronic device determines that the relevant satellite is available for the position measurement. That is, even when the first satellite information having the first state information or the second state information about the relevant satellite is not healthy, yet when the second satellite information having the first state information or the second state information about the relevant satellite is healthy, then the electronic device uses the relevant satellite for the position measurement. On the other hand, when the second satellite information having the first state information or the second state information about the relevant satellite is not healthy, as determined in step 406, then the electronic device proceeds to step 412.

In step 412, the electronic device determines that the relevant satellite is unavailable for the position measurement, and excludes the relevant satellite for the position measurement. In step 414, after the lapse of the time t, the electronic device rechecks the second satellite information having the first state information or the second state information about the relevant satellite, based on the second satellite information received from the GNSS server through the network, and determines whether the relevant satellite is available for the position measurement. Thereafter, the electronic device ends the process of the second exemplary embodiment of FIG. 4.

In the second exemplary embodiment of FIG. 4, the first state information and the second state information of the second satellite information are compared with the first state information and the second state information of the first satellite information, and a process scheme according to the comparison result is the same as Table 2 below.

TABLE 2

|  | case 1 | case 2 | case 3 |
|---|---|---|---|
| Satellite | healthy | unhealthy | unhealthy |
| GNSS Server | — | unhealthy | healthy |
| Processing | Use satellite information | Do not use satellite information | Use satellite information |

Figure 5:
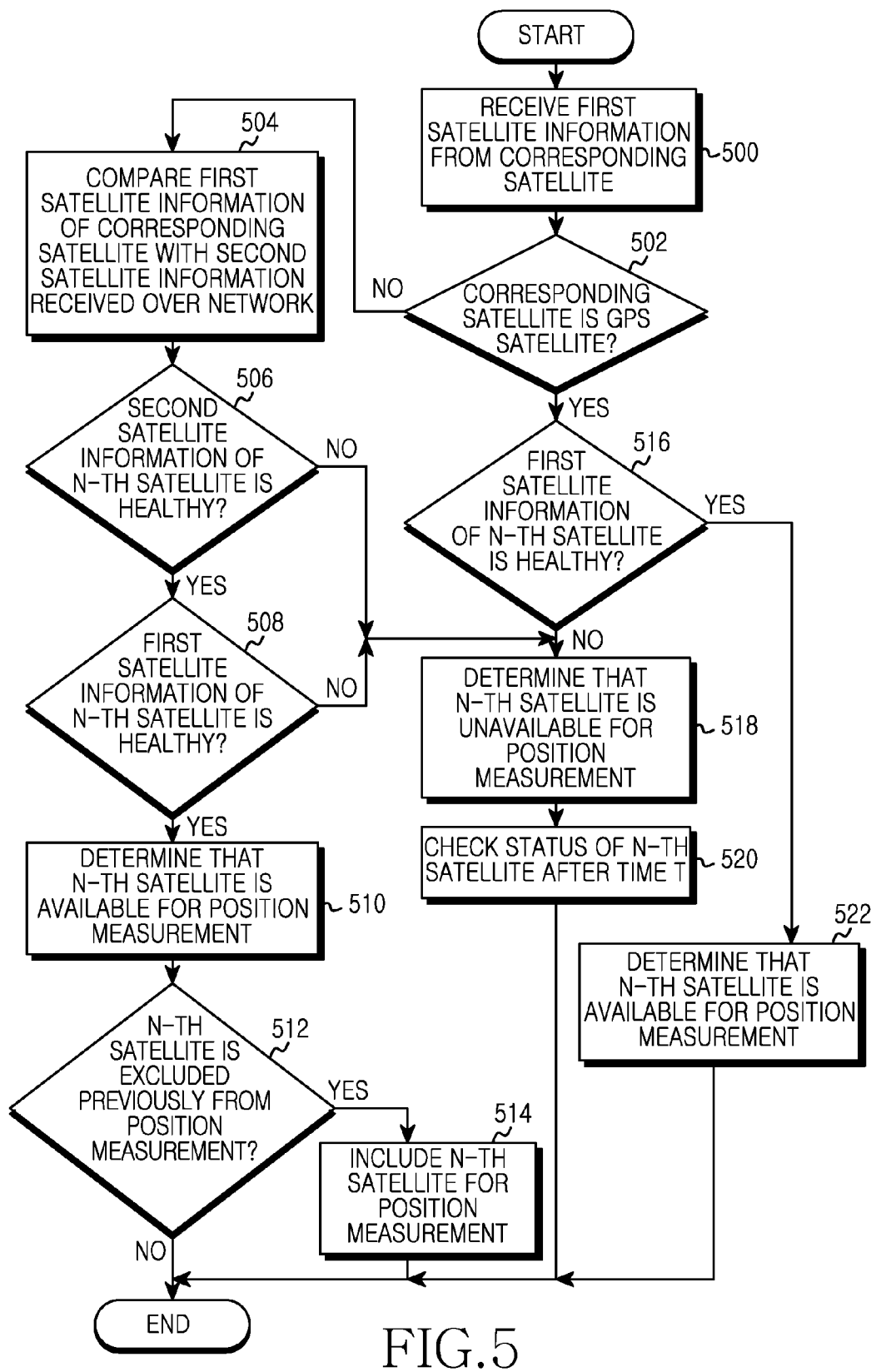
FIG. 5 is a flow diagram illustrating a position measuring process according to a third exemplary embodiment of the present invention.

FIG. 5 is a flow diagram illustrating a position measuring process according to a third exemplary embodiment of the present invention.

Referring to FIG. 5, in step 500, an electronic device including a GPS receiver receives first satellite information from a relevant satellite, wherein the relevant satellite may be the $n^{th}$ satellite of N satellites used for the position measuring process. The relevant satellite may be one of a GPS satellite, a GLONASS satellite, a Galileo satellite, a Compass satellite, or any other similar and or suitable satellite. The first satellite information may include satellite orbit information, i.e., ephemeris information, Almanac information, and correction coefficients. In particular, according to the present exemplary embodiment, the first satellite information may include first state information indicating whether a satellite is healthy, and/or second state information indicating whether a navigation message of a satellite is healthy.

Thereafter, in step 502, the electronic device determines whether the relevant satellite is a GPS satellite. When the relevant satellite is a GPS satellite, the electronic device proceeds to step 516. In step 516, the electronic device determines whether the first satellite information having the first state information or the second state information about the relevant satellite is healthy. When the first satellite information having the first state information or the second state information about the relevant satellite is healthy, as determined in step 516, then the electronic device proceeds to step 522. In step 522, the electronic device determines that the relevant satellite is available for the position measurement.

On the other hand, when the first satellite information having the first state information or the second state information about the relevant satellite is not healthy, as determined in step 516, then the electronic device proceeds to step 518. In step 518, the electronic device determines that the relevant satellite is unavailable for the position measurement, and excludes the relevant satellite from the position measurement. Next, in step 520, after the lapse of the time t, the electronic device checks the second satellite information having the first state information or the second state information about the relevant satellite based on the second satellite information received from the GNSS server through the network, and then determines whether the relevant satellite is available for the position measurement.

On the other hand, when the relevant satellite is not a GPS satellite, as determined in step 502, then the electronic device compares the first satellite information of the relevant satellite and the second satellite information related to the relevant satellite in step 504. That is, the electronic device compares the first satellite information having the first state information or the second state information about the relevant satellite and the second satellite information having the first state information or the second state information about the relevant satellite. Alternatively, the electronic device may compare the first satellite information having the first state information or the second state information about a plurality of satellites and the second satellite information having the first state information or the second state information about a plurality of satellites.

Thereafter, in step 506, the electronic device determines whether the second satellite information having the first state information or the second state information about the relevant satellite is healthy. When the second satellite information having the first state information or the second state information about the relevant satellite is healthy, then the electronic device proceeds to step 508. Next, in step 508, the electronic device determines whether the first satellite information having the first state information or the second state information about the relevant satellite is healthy. When the first satellite information having the first state information or the second state information about the relevant satellite is healthy, then the electronic device proceeds to step 510. In step 510, the electronic device determines that the relevant satellite is available for the position measurement.

On the other hand, when the second satellite information having the first state information or the second state information about the relevant satellite is not healthy, as determined in step 506, or when the first satellite information having the first state information or the second state information about the relevant satellite is not healthy, as determined in step 508, then the electronic device proceeds to step 518.

That is, when at least one of the second satellite information having the first state information or the second state information about the relevant satellite and the first satellite information having the first state information or the second state information about the relevant satellite is not healthy, then the electronic device determines that the relevant satellite is unavailable for the position measurement, and, in step 518, excludes the relevant satellite from the position measurement.

Also, in step 512, the electronic device determines whether the relevant satellite was previously excluded from the position measurement. When the relevant satellite was previously excluded, the electronic device proceeds to step 514 in order to now include the relevant satellite for position measurement. On the other hand, when the relevant satellite was not previously excluded, then the electronic device ends the process of the third exemplary embodiment.

That is, the third exemplary embodiment of FIG. 5 determines whether the relevant satellite is a GPS satellite, determines whether to include the relevant satellite in the position measurement according to the state information about the relevant satellite of the second satellite information received from the relevant satellite when the relevant satellite is a GPS satellite, and determines whether to include the relevant satellite in the position measurement according to the process of FIG. 3 when the relevant satellite is not a GPS satellite.

Figure 6:
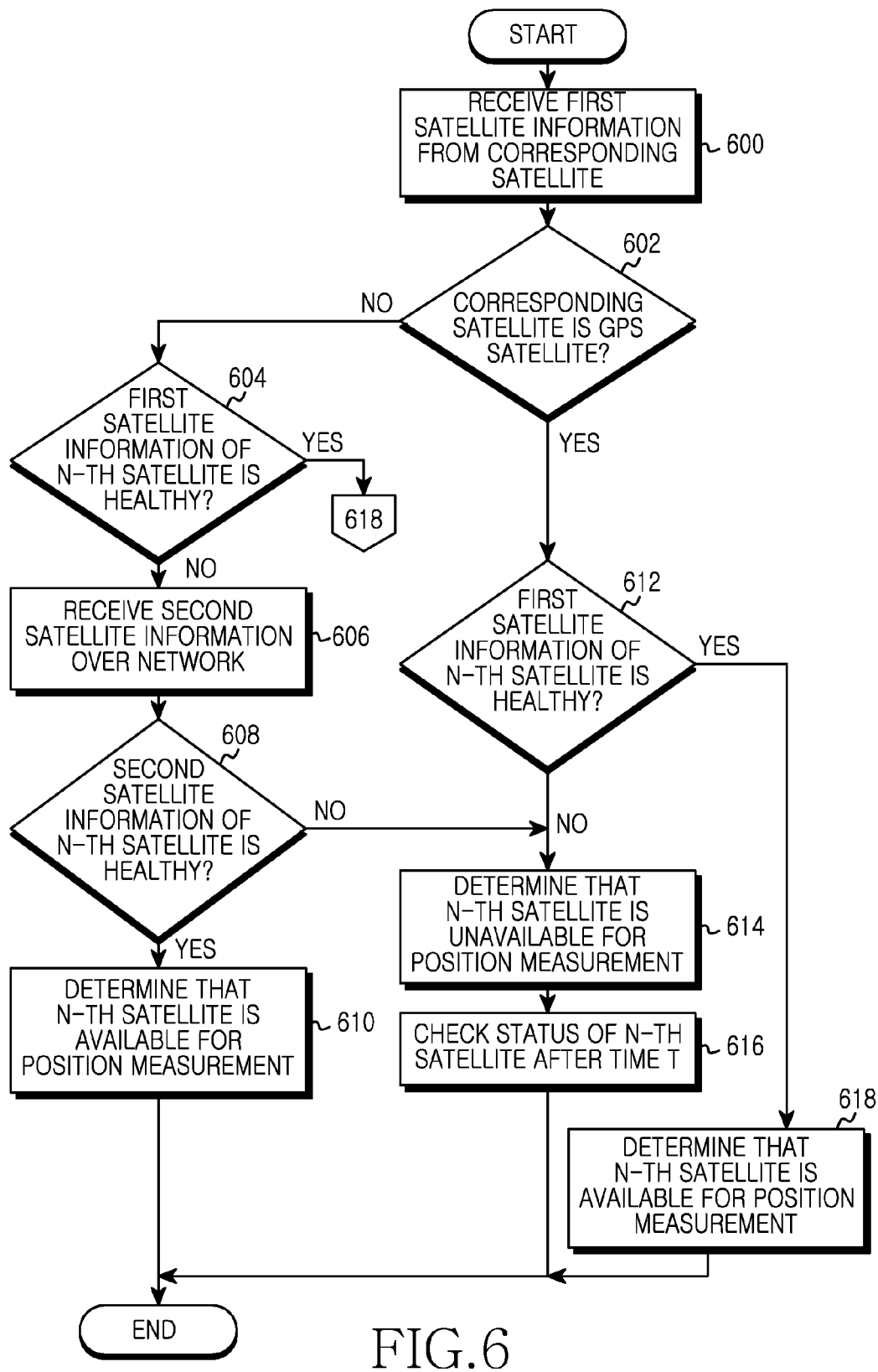
FIG. 6 is a flow diagram illustrating a position measuring process according to a fourth exemplary embodiment of the present invention.

FIG. 6 is a flow diagram illustrating a position measuring process according to a fourth exemplary embodiment of the present invention.

Referring to FIG. 6, in step 600, an electronic device including a GPS receiver receives first satellite information from a relevant satellite, wherein the relevant satellite may be the $n^{th}$ satellite of N satellites used for the position measuring process. The relevant satellite may be one of a GPS satellite, a GLONASS satellite, a Galileo satellite, a Compass satellite, and any other similar and/or suitable satellite. The first satellite information may include satellite orbit information, i.e., ephemeris information, Almanac information, and correction coefficients. In particular, according to the present exemplary embodiment, the first satellite information may include first state information indicating whether a satellite is healthy, and/or second state information indicating whether a navigation message of a satellite is healthy.

Thereafter, in step 602, the electronic device determines whether the relevant satellite is a GPS satellite. When the relevant satellite is a GPS satellite, the electronic device proceeds to step 612. In step 612, the electronic device determines whether the first satellite information having the first state information or the second state information about the relevant satellite is healthy. When, for the first satellite information, at least one of the first state information or the second state information about the relevant satellite is healthy, as determined in step 612, then the electronic device proceeds to step 618. In step 618, the electronic device determines that the relevant satellite is available for the position measurement. On the other hand, when the first satellite information having the first state information or the second state information about the relevant satellite is not healthy, as determined in step 612, then the electronic device proceeds to step 614.

On the other hand, when the relevant satellite is not a GPS satellite, as determined in step 602, then, in step 604, the electronic device determines whether the first satellite information having the first state information or the second state information about the relevant satellite is healthy. When the first satellite information having the first state information or the second state information about the relevant satellite is healthy, then the electronic device proceeds to step 618.

On the other hand, when the first satellite information having the first state information or the second state information about the relevant satellite is not healthy, then, in step 606, the electronic device requests and receives second satellite information from the GNSS server via a network. According to another exemplary embodiment, the electronic device may periodically receive the second satellite information from the GNSS without request. Thereafter, in step 608, the electronic device determines whether the second satellite information having the first state information or the second state information about the relevant satellite is healthy. When the second satellite information having the first state information or the second state information about the relevant satellite is healthy, then the electronic device proceeds to step 610.

In step 610, the electronic device determines that the relevant satellite is available for the position measurement. That is, even when the first satellite information having the first state information or the second state information about the relevant satellite is not healthy, and when the second satellite information having the first state information or the second state information about the relevant satellite is healthy, then the electronic device uses the relevant satellite for the position measurement. On the other hand, when the second satellite information having the first state information or the second state information about the relevant satellite is not healthy, as determined in step 608, then the electronic device proceeds to step 614.

In step 614, the electronic device determines that the relevant satellite is unavailable for the position measurement, and excludes the relevant satellite from the position measurement. Next, in step 616, after the lapse of the time t, the electronic device checks the second satellite information having the first state information or the second state information about the relevant satellite based on the second satellite information received from the GNSS server through the network, and then determines whether the relevant satellite is available for the position measurement. Thereafter, the electronic device ends the process of the fourth exemplary embodiment.

That is, the fourth exemplary embodiment of FIG. 5 determines whether the relevant satellite is a GPS satellite, determines whether to include the relevant satellite for the position measurement based on the state information about the relevant satellite of the second satellite information received from the relevant satellite when the relevant satellite is a GPS satellite, and determines whether to include the relevant satellite for the position measurement according to the process of FIG. 4 when the relevant satellite is not a GPS satellite.

Figure 7:
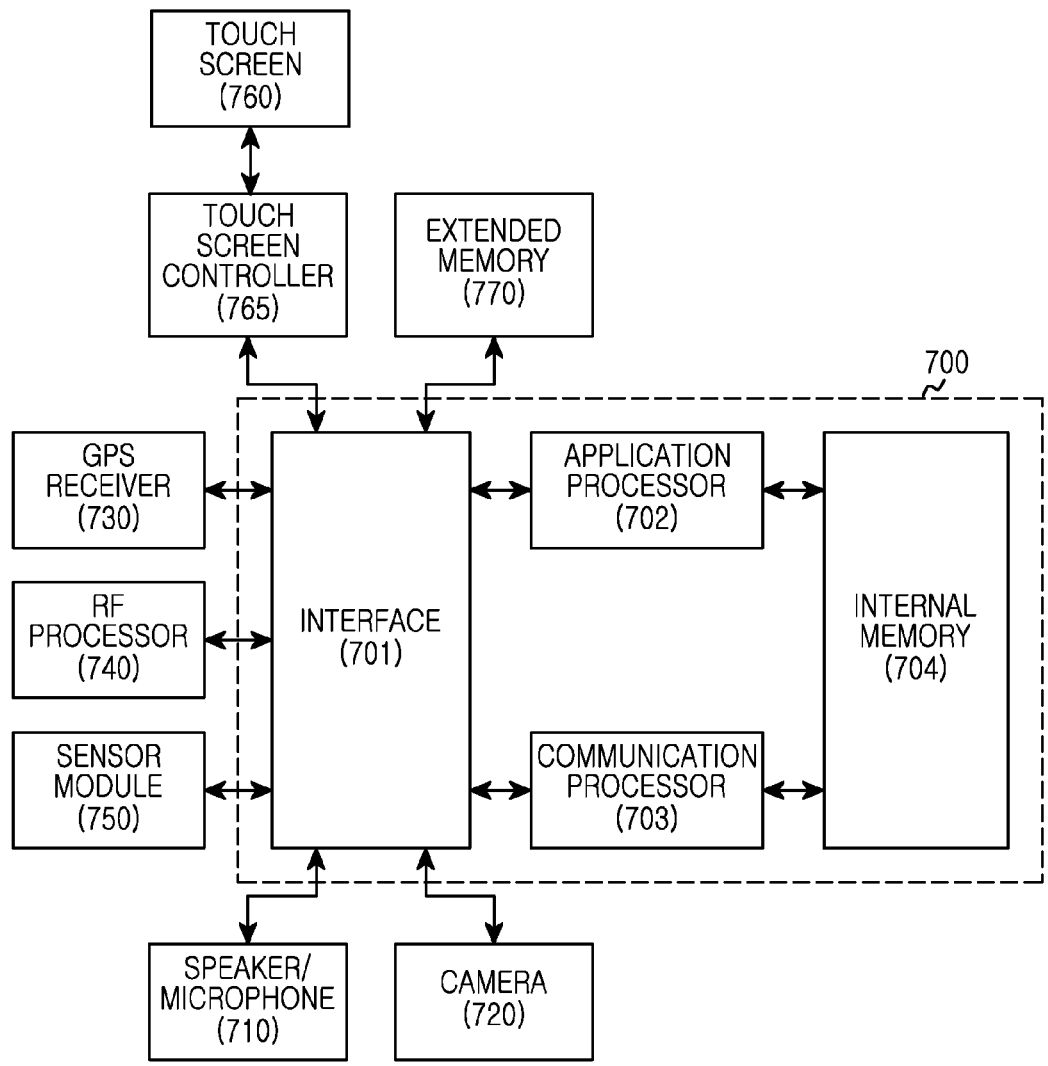
FIG. 7 is a block diagram illustrating a configuration of an electronic device according to an exemplary embodiment of the present invention.

FIG. 7 illustrates a portable electronic device including a GPS receiver according to an exemplary embodiment of the present invention.

Referring to FIG. 7, the electronic device may be a portable electronic device, such as a portable terminal, a mobile phone, a mobile pad, a media player, a tablet computer, a handheld computer, a Personal Digital Assistant (PDA), and any other similar and/or suitable electronic device. Also, the electronic device may be any portable electronic device including a combination of two or more functions of the above-mentioned devices.

The electronic device may include an extended memory 770, a controller 700, a GPS receiver 730, an RF processor 740, a sensor module 750, a speaker/microphone 710, a camera 720, and a touchscreen 760, and a touchscreen controller 765. However, the present invention is not limited thereto, and the electronic device may not include some of the noted items, and/or may include any suitable and/or similar combination of the above noted items. Furthermore, the electronic device may include other elements used in the operation of electronic device, such as a keyboard, a network connector, and other similar and/or suitable elements.

The controller 700 may include an interface 701, an application processor 702, a communication processor 703, and an internal memory 704. In some cases, the controller 700 may also be referred to as a processor. The interface 701, the application processor 702, the communication processor 703, and the internal memory 704 may be separate unit, or may be integrated into one or more integrated circuits.

The application processor 702 may execute various software programs in order to perform various functions for the electronic device, and the communication processor 703 may perform processes and controls for voice communication and data communication. In addition to these general functions, the processors 702 and 703 may execute a software module, such as an instruction set, that is stored in the internal memory 704 and may perform various functions corresponding to the software module. That is, the processors 702 and 703 may perform the methods of the exemplary embodiments of the present invention in cooperation with software modules stored in the extended memory 770 or the internal memory 703.

According to the first exemplary embodiment as shown in FIG. 3, the application processor 720 may receive the first satellite information from a relevant satellite through the GPS receiver 730, and the communication processor 703 may receive the second satellite information from a GNSS server through the RF processor 740. The application processor 702 may compare the first satellite information of the relevant satellite and the second satellite information related to the relevant satellite, and may determine that the relevant satellite is available for the position measurement when both the second satellite information having the first state information or the second state information about the relevant satellite and the first satellite information having the first state information or the second state information about the relevant satellite are healthy. When at least one of the second satellite information having the first state information or the second state information about the relevant satellite and the first satellite information having the first state information or the second state information about the relevant satellite is not healthy, then the application processor 702 may determine that the relevant satellite is unavailable for the position measurement, and the application processor 702 may exclude the relevant satellite from the position measurement. After the lapse of the time t, the application processor 702 may recheck the first state information or the second state information about the relevant satellite based on the second satellite information received from the GNSS server through the network, and may determine whether the relevant satellite is available for the position measurement.

In the second exemplary embodiment as shown in FIG. 4, the application processor 720 may receive first satellite information from a relevant satellite through the GPS receiver 730. Thereafter, the application processor 720 may determine whether the first satellite information having the first state information or the second state information about the relevant satellite is healthy, and may then determine that the relevant satellite is available for the position measurement when the first satellite information having the first state information or the second state information about the relevant satellite is healthy. When the first satellite information having the first state information or the second state information about the relevant satellite is not healthy, then the application processor 720 may request and receive the second satellite information from the GNSS server and may then determine whether the second satellite information the first state information or the second state information about the relevant satellite is healthy. When the second satellite information having the first state information or the second state information about the relevant satellite is healthy, then the application processor 702 may determine that the relevant satellite is available for the position measurement. On the other hand, when the second satellite information having the first state information or the second state information about the relevant satellite is not healthy, then the application processor 702 may determine that the relevant satellite is unavailable for the position measurement, and the application processor 702 may exclude the relevant satellite from the position measurement. After the lapse of the time t, the application processor 702 may recheck the second satellite information having the first state information or the second state information about the relevant satellite based on the second satellite information received from the GNSS server through the network, and may then determine whether the relevant satellite is available for the position measurement.

In the third exemplary embodiment, as shown in FIG. 5, the application processor 702 may determine whether the relevant satellite is a GPS satellite, and may determine whether to include the relevant satellite for the position measurement according to the state information about the relevant satellite of the second satellite information received from the relevant satellite when the relevant satellite is a GPS satellite. Furthermore, the application processor 702 may determine whether to include the relevant satellite for the position measurement according to the process of the first exemplary embodiment of the present invention when the relevant satellite is not a GPS satellite.

In the fourth exemplary embodiment, as shown in FIG. 6, the application processor 702 may determine whether the relevant satellite is a GPS satellite, may determine whether to include the relevant satellite for the position measurement based on the state information about the relevant satellite of the second satellite information received from the relevant satellite when the relevant satellite is a GPS satellite, and may determine whether to include the relevant satellite for the position measurement according to the process of the first exemplary embodiment of the present invention when the relevant satellite is not a GPS satellite.

Other processors (not illustrated) may include at least one data processor, image processor, a codec, or any other suitable and/or similar processors for executing functions, operations, and applications of the electronic device. The data processor, the image processor, the codec, or any other suitable and/or similar processor may be configured separately. Also, the processor may be configured by a plurality of processors performing different functions. The interface 701 may be connected to the touch screen controller 765 and to the extended memory 770 of the electronic device.

The sensor module 750 may be connected to the interface 701 in order to perform various functions. For example, a motion sensor and an optical sensor may be connected to the interface 701 in order to detect a motion of the electronic device and in order detect light from the outside. In addition, other sensors, such as a position measuring system, a temperature sensor, a biosensor, and any other similar and/or suitable sensor, may be connected to the interface 701 in order to perform relevant functions. The camera 720 may be connected through the interface 701 to the sensor module 750 in order to perform camera functions such as photographing and video clip recording.

The RF processor 740 may perform communication functions. For example, under the control of the communication processor 703, the RF processor may convert an RF signal into a baseband signal and may provide the same to the communication processor 703, or may convert a baseband signal from the communication processor 703 into an RF signal prior to transmission. Herein, the communication processor 703 may process baseband signals according to various communication schemes. For example, the communication schemes may include, but not limited to, a Global System for Mobile Communication (GSM) communication scheme, an Enhanced Data GSM Environment (EDGE) communication scheme, a Code Division Multiple Access (CDMA) communication scheme, a W-Code Division Multiple Access (W-CDMA) communication scheme, a Long Term Evolution (LTE) communication scheme, an Orthogonal Frequency Division Multiple Access (OFDMA) communication scheme, a Wireless Fidelity (WiFi) communication scheme, a WiMax communication scheme, a Bluetooth communication scheme, and any other similar and/or suitable communication scheme that may be used by the electronic device.

The speaker/microphone 710 may perform audio stream input/output operations, such as voice recognition, voice replication, digital recording, phone functions, and any other similar and/or suitable operations using at least one of a speaker and a microphone. That is, the speaker/microphone 710 may convert a voice signal into an electrical signal or may covert an electrical signal into a voice signal. Although not illustrated, an attachable/detachable earphone, a headphone, or a headset may be connected through an external port to the electronic device.

The touchscreen controller 765 may be connected to the touchscreen 760. For example, the touchscreen 760 and the touchscreen controller 765 may detect a touch, a motion, a stop of the motion, or any other similar and/or suitable gesture that may be executed using the touchscreen 760 by using multi-touch detection technologies including a proximity sensor array or other elements, as well as capacitive, resistive, infrared and surface acoustic wave technologies for determining one or more touch points with the touchscreen 760. The touchscreen 760 may provide an input/output interface between the electronic device and the user. That is, the touchscreen 760 may transmit a user touch input to the electronic device. Also, the touchscreen 760 may display an output from the electronic device to the user. That is, the touchscreen 760 may display a visual output to the user. The visual output may be represented by a text, a graphic, a video, a combination thereof, or may be any other similar and/or suitable visual output.

In the present exemplary embodiments, the electronic device may display GPS position information or an application screen using the position information on a screen, such as the touchscreen 760, of the electronic device. This screen also may be a touchscreen that processes a touch input. The touchscreen 760 may use various display technologies. For example, the touchscreen 760 may use a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), a Flexible LED (FLED), or any other similar and/or suitable display device.

The GPS receiver 730 may convert signals received from satellites into information, such as a position, a speed, a time and any other similar and/or suitable type of information that may be derived from a GPS signal. For example, the distance between a satellite and the GPS receiver may be calculated by multiplying the velocity of light by a signal arrival time, and the position of a receiver may be measured by triangulation by obtaining accurate positions and distances of three satellites.

The extended memory 770 may include one or more high-speed Random-Access Memories (RAMs), such as magnetic disk storage devices, one more nonvolatile memories, one or more optical storage devices, one or more flash memories, such as Not AND (NAND) flash memories or Not OR (NOR) flash memories, or any other similar and/or suitable type of non-volatile and/or non-transitory computer readable storage medium. The extended memory 770 or the internal memory 704 may store software. Elements of the software may include an Operation System (OS) software module, a communication software module, a graphic software module, a User Interface (UI) software module, an Motion Picture Experts Group (MPEG) module, a camera software module, one or more application software modules, or any other similar and/or suitable module or elements of software. Since the module that is an element of the software may be represented as a set of instructions, the module may be referred to as an instruction set. The module may also be referred to as a program.

The OS software may include various software elements for controlling general system operations. For example, general system operation controls may include memory control/management, storage hardware and/or storage device control/management, power control/management, and any other similar and/or suitable general system operation. The OS software may also perform a function for enabling smooth communication between various hardware elements and/or hardware devices and software elements and/or software modules. The communication software module may enable communication with other electronic devices, such as computers, servers, and/or portable terminals, through the RF processor 740. The communication software module may include a protocol structure corresponding to a relevant communication scheme.

The graphic software module may include various software elements for providing and displaying graphics on the touchscreen 760. The graphics may include texts, web pages, icons, digital images, videos, and animations. The UI software module may include various software elements related to a user interface. Specifically, the UI software module may include information about how the state of a user interface changes and/or information about under what condition the state of a user interface changes.

The camera software module may include camera-related software elements that enable camera-related processes and functions. The application module may include a browser application, an e-mail application, an instant message application, a word processing application, a keyboard emulation application, an address book application, a touch list application, a widget application, a Digital Right Management (DRM) application, a voice recognition application, a voice replication application, a position determining function application, a Location-Based Service (LBS) application, and the like. The extended memory 770 and the internal memory 704 may further include an additional module, which may be instructions, in addition to the above-described modules. Also, in some cases, the memories 770 and 704 may not use some of the modules and/or instructions. According to the present exemplary embodiment, the application module may include instructions for performing a position determining function based on satellite information received from satellites and satellite information received from a server.

The instructions, according to the first exemplary embodiment, as shown in FIG. 3, may include receiving first satellite information from a relevant satellite and receiving second satellite information from a GNSS server, comparing the first satellite information of the relevant satellite and the second satellite information related to the relevant satellite, and determining that the relevant satellite is available in the position measurement when both the second satellite information having the first state information or the second state information about the relevant satellite and the first satellite information having the first state information or the second state information about the relevant satellite are healthy. Furthermore, the instructions, according to the first exemplary embodiment, may also include determining that the relevant satellite is unavailable in the position measurement, and excluding the relevant satellite from the position measurement when at least one of the second satellite information having the first state information or the second state information about the relevant satellite and the first satellite information having the first state information or the second state information about the relevant satellite is not healthy. The instructions, according to the first exemplary embodiment, may also include rechecking, after the lapse of the time t, the second satellite information having the first state information or the second state information about the relevant satellite based on the second satellite information received from the GNSS server through the network, and determining whether the relevant satellite is available for the position measurement.

The instructions according to the second exemplary embodiment of the present invention may include receiving first satellite information from a relevant satellite, determining whether the first satellite information having the first state information or the second state information about the relevant satellite is healthy, and determining that the relevant satellite is available for the position measurement, when the first satellite information having the first state information or the second state information about the relevant satellite is healthy. The instructions according to the second exemplary embodiment may also include requesting and receiving second satellite information from the GNSS server and determining whether the second satellite information having the first state information or the second state information about the relevant satellite is healthy when the first satellite information having the first state information or the second state information about the relevant satellite is not healthy, and determining that the relevant satellite is available for the position measurement when the second satellite information having the first state information or the second state information about the relevant satellite is healthy. The instructions according to the second exemplary embodiment may further includes determining that the relevant satellite is unavailable for the position measurement and excluding the relevant satellite from the position measurement when the second satellite information having the first state information or the second state information about the relevant satellite is not healthy, and rechecking, after the lapse of the time t, the second satellite information having the first state information or the second state information about the relevant satellite based on the second satellite information received from the GNSS server through the network, and determining whether the relevant satellite is available for the position measurement.

The instructions according to the third exemplary embodiment may include determining whether the relevant satellite is a GPS satellite, determining whether to include the relevant satellite in the position measurement based on the state information about the relevant satellite of the second satellite information received from the relevant satellite when the relevant satellite is a GPS satellite, and determining whether to include the relevant satellite in the position measurement according to the process of the first exemplary embodiment when the relevant satellite is not a GPS satellite.

The instructions according to the fourth exemplary embodiment may include determining whether the relevant satellite is a GPS satellite, determining whether to include the relevant satellite in the position measurement based on the state information about the relevant satellite of the second satellite information received from the relevant satellite when the relevant satellite is a GPS satellite, and determining whether to include the relevant satellite in the position measurement according to the process of the first exemplary embodiment when the relevant satellite is not a GPS satellite.

In addition, various functions of the electronic device of the present exemplary embodiments, which have been described above and will be described below, may be implemented by any combination of hardware and/or software including one or more processors, an Application-Specific Integrated Circuit (ASIC), or any other similar and/or suitable hardware element for executing instructions, functions, and the like.

Figure 8:
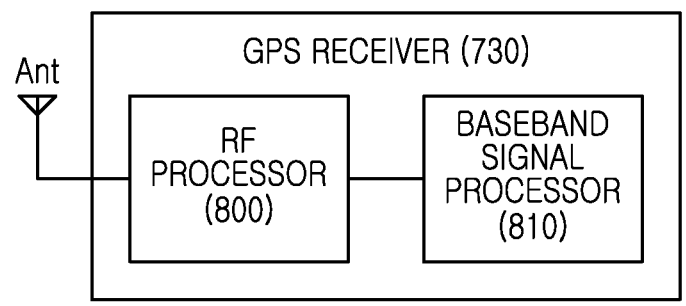
FIG. 8 illustrates a Global Positioning System (GPS) receiver according to an exemplary embodiment of the present invention.

FIG. 8 illustrates a GPS receiver according to an exemplary embodiment of the present invention.

Referring to FIG. 8, the GPS receiver 730 may include an RF processor 800 and a baseband signal processor 810. The RF processor 800 may convert an RF analog signal received from an antenna into a signal format, which may be processed in the baseband signal processor 810, by amplification or conversion into a digital signal. The baseband signal processor 810 may determine a Precompiled-code (P-code) and a Course/Acquisition-code (C/A-code) signal by performing a correlation operation between a P-code and a C/A-code from the RF processor 800 and a predetermined P-code and C/A-code. A transmission time may be calculated according to the determined P-code and C/A-code signal. Also, a position may be determined using a pseudo distance from at least three satellites.

Figure 9:
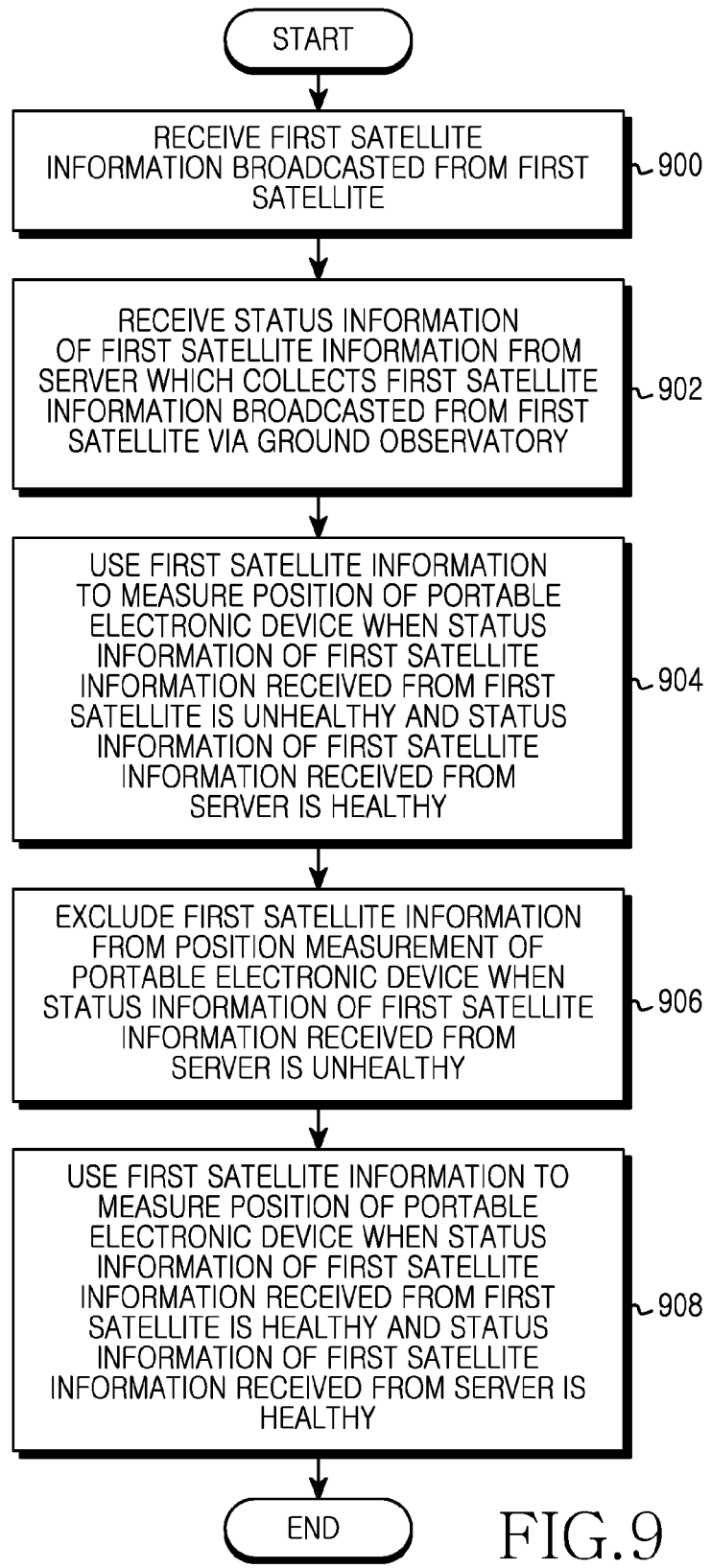
FIG. 9 is a flow diagram illustrating a position measuring process according to an exemplary embodiment of the present invention.

FIG. 9 is a flow diagram illustrating a position measuring process according to an exemplary embodiment of the present invention.

Referring to FIG. 9, an electronic device may receive first satellite information broadcast from a first satellite in step 900. Next, in step 902, the electronic device may receive state information of the first satellite information from a server that collects the first satellite information broadcast from the first satellite through a ground observatory, which may also be referred to as a terrestrial observatory. The electronic device may use the first satellite information in order to measure the position of the portable electronic device when the state information of the first satellite information received from the first satellite is unhealthy and the state information of the first satellite information received from the server is healthy in step 904.

Next, in step 906, the electronic device may exclude the first satellite information from the position measurement for the portable electronic device when the state information of the first satellite information received from the server is unhealthy. The electronic device may then use the first satellite information in order to measure the position of the portable electronic device when the state information of the first satellite information received from the first satellite is healthy and the state information of the first satellite information received from the server is healthy in step 908.

In addition, the electronic device may determine whether the first satellite is a GPS satellite, after receiving the first satellite information, and may receive the state information of the first satellite information from the server when the first satellite is not a GPS satellite. The first satellite information may include state information of second satellite information from a second satellite. In this case, the electronic device uses the second satellite information for the position measurement of the portable electronic device when the state information of the second satellite information is unhealthy and the state information of the second satellite information received from the server is healthy.

The methods according to the exemplary embodiments described above may be implemented by hardware, software, or a combination thereof. When the methods are implemented by software, a non-transitory computer-readable storage medium may be provided to store one or more programs, which may also be referred to as software modules. The one or more programs stored in the non-transitory computer-readable storage medium may be configured for execution by one or more processors in an electronic device. The one or more programs may include instructions for causing the electronic device to execute the methods according to the exemplary embodiments described herein.

These programs, software modules, or software, may be stored in Random Access Memories (RAMs), nonvolatile memories including flash memories, Read Only Memories (ROMs), Electrically Erasable Programmable ROMs (EE-PROMs), magnetic disc storage devices, Compact Disc-ROMs (CD-ROMs), Digital Versatile Discs (DVDs), other types of optical storage devices, or magnetic cassettes. Also, the programs may be stored in a memory configured by a combination of some or all of such storage devices. Also, each of the memories may be provided in plurality.

Also, the programs may be stored in an attachable storage device that can be accessed by the electronic device through a communication network such as Internet, Intranet, Local Area Network (LAN), Wireless LAN (WLAN), or Storage Area Network (SAN), or through a communication network configured by a combination thereof. This storage device may be accessed by the electronic device through an external port. Also, a separate storage device on a communication network may be accessed by a portable electronic device.

As described above, the present exemplary embodiments provide an apparatus and a method that excludes a faulty satellite in a high-complexity environment in which various GNSSs are used, and determines a state of an excluded satellite and recovers the excluded satellite, thereby making it possible to prevent the degradation of the position determining performance through the satellite after the lapse of a long time.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
   a first communication module;
   a second communication module; and
   a processor configured to:
      receive, using the first communication module, location information corresponding to a satellite and first state information corresponding to the satellite from the satellite,
      receive, using the second communication module, second state information corresponding to the satellite from an external device,
      determine a state of the satellite by comparing the first state information and the second state information,
      identify a position of the apparatus using the location information based at least in part on a determination that the state satisfies a specified condition, and
      refrain from identifying the position using the location information based at least in part on a determination that the state does not satisfy the specified condition.

2. The apparatus of claim 1,
   wherein the first communication module comprises a global positioning system (GPS) module, and
   wherein the processor is further configured to:
      identify the location information and the first state information received from the GPS module.

3. The apparatus of claim 1,
   wherein the second communication module comprises a cellular communication module, and
   wherein the processor is further configured to:
      identify the second state information received from the cellular communication module.

4. The apparatus of claim 1,
   wherein the satellite comprises one or more global positioning system (GPS) satellites, and
   wherein the processor is further configured to:
      select at least one GPS satellite of the one or more GPS satellites based at least in part on the first state information.

5. The apparatus of claim 1,
   wherein the external device comprises a server, and
   wherein the processor is further configured to:
      identify the second state information in relation with the satellite received from the server.

6. The apparatus of claim 1, wherein the processor is further configured to:
   receive an indication indicating whether the location information is valid to determine the position from the satellite or the external device.

7. The apparatus of claim 1, wherein the processor is further configured to:
   determine the state as healthy, if the first state information and the second state information is valid to determine the position.

8. The apparatus of claim 7, wherein the processor is further configured to:
   perform the identifying if the state is determined as healthy.

9. The apparatus of claim 1, wherein the processor is further configured to:
   determine the state as unhealthy, if the first state information or the second state information is invalid to determine the position.

10. The apparatus of claim 1, wherein the processor is further configured to:
    update the state on a basis of a specified time period.

11. The apparatus of claim 10, wherein the processor is further configured to:
    identify the position using the location information if the updated state is determined as healthy.

12. A method comprising:
    receiving, at an electronic device including a first communication module and a second communication module, location information corresponding to a satellite and first state information corresponding to the satellite from the satellite using the first communication module;
    receiving, using the second communication module, a second state information corresponding to the satellite from an external device;
    determining a state of the satellite by comparing the first state information and the second state information;
    identifying a position of the electronic device using the location information based at least in part on a determination that the state satisfies a specified condition; and
    refraining from identifying the position using the location information based at least in part on a determination the state does not satisfy the specified condition.

13. The method of claim 12, wherein the first state information and the second state information comprises:
    an indication indicating whether the location information is valid to determine the position.

14. The method of claim 12, wherein the determining comprises:
    determine the state as healthy, if the first state information and the second state information is valid to determine the position.

15. The method of claim 14, wherein the identifying comprises:
    identifying the position using location information, if the state is determined as healthy.

16. The method of claim 12, wherein the determining comprises:
    determine the state as unhealthy, if the first state information and the second state information is invalid to determine the position.

17. The method of claim 12, wherein the identifying comprises:

determining whether the satellite is a global positioning system (GPS) satellite; and
identifying the position using the location information based at least in part on the determination that the satellite is the GPS satellite.

18. The method of claim 12, further comprising:
updating the state on a basis of a specified time period.

19. The method of claim 18, wherein the identifying comprises:
identify the position using the location information if the updated state is determined as healthy.

20. A non-transitory machine-readable storage device storing instructions that, when executed by one or more processors, cause the one or more processors to perform operations comprising:
receiving, at an electronic device including a first communication module and a second communication module, location information corresponding to a satellite and first state information corresponding to the satellite from the satellite using the first communication module;
receiving, using the second communication module, a second state information corresponding to the satellite from an external device;
determining a state of the satellite by comparing the first state information and the second state information;
identifying a position of the electronic device using the location information based at least in part on a determination that the state satisfies a specified condition; and
refraining from identifying the position using the location information based at least in part on a determination the state does not satisfy the specified condition.

21. A method for position measurement of a portable electronic device, the method comprising:
receiving, from a satellite, satellite information including state information of the satellite;
receiving other state information of the satellite from an external device; and
determining whether to use the satellite for the position measurement of the portable electronic device by comparing the state information of the satellite received from the satellite and the other state information of the satellite received from the external device,
wherein healthy state information indicates that the satellite information may be used for the position measurement of the portable electronic device and unhealthy state information indicates that the satellite information may not be used for the position measurement of the portable electronic device.

22. A portable electronic device, the device comprising:
at least one processor;
a memory; and
at least one program stored in the memory and configured to be executed by the at least one processor,
wherein the program comprises instructions for:
receiving, from a satellite, satellite information including state information of the satellite,
receiving other state information of the satellite from an external device, and
determining whether to use the satellite for position measurement of the portable electronic device by comparing the state information of the satellite received from the satellite and the other state information of the satellite received from the external device,
wherein healthy state information indicates that the satellite information may be used for the position measurement of the portable electronic device and unhealthy state information indicates that the satellite information may not be used for the position measurement of the portable electronic device.

\* \* \* \* \*